United States Patent
Kupratis

(10) Patent No.: US 10,954,857 B2
(45) Date of Patent: *Mar. 23, 2021

(54) CROSSOVER COOLING FLOW FOR MULTI-ENGINE SYSTEMS

(71) Applicant: UNITED TECHNOLOGIES CORPORATION, Farmington, CT (US)

(72) Inventor: Daniel Bernard Kupratis, Wallingford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 59 days.

This patent is subject to a terminal disclaimer.

(21) Appl. No.: 16/012,295

(22) Filed: Jun. 19, 2018

(65) Prior Publication Data

US 2019/0383218 A1 Dec. 19, 2019

(51) Int. Cl.
*F02C 7/18* (2006.01)
*F02C 3/13* (2006.01)
*F02C 6/02* (2006.01)

(52) U.S. Cl.
CPC ............... *F02C 7/18* (2013.01); *F02C 3/13* (2013.01); *F02C 6/02* (2013.01); *F05D 2220/329* (2013.01); *F05D 2260/20* (2013.01)

(58) Field of Classification Search
CPC .... F01D 25/12; F02C 3/13; F02C 6/02; F02C 6/04; F02C 6/06; F02C 6/08; F02C 7/18; F02C 9/18; F05D 2220/329

See application file for complete search history.

(56) References Cited

U.S. PATENT DOCUMENTS

| | | | | |
|---|---|---|---|---|
| 3,869,862 A * | 3/1975 | Dickey | ...................... | F02C 6/02 60/39.15 |
| 2008/0112791 A1* | 5/2008 | Lee | .......................... | F01D 25/12 415/58.4 |
| 2010/0326085 A1 | 12/2010 | Veilleux | | |
| 2015/0152783 A1* | 6/2015 | Acquisti | ................. | F02C 3/107 60/39.15 |
| 2016/0273400 A1* | 9/2016 | Ekanayake | ............. | F01K 23/10 |
| 2017/0016399 A1 | 1/2017 | Bedrine et al. | | |

OTHER PUBLICATIONS

Daniel Bernard Kupratis, "Airfoil Cooling System" dated Jun. 19, 2018 in U.S. Appl. No. 16/012,331.

* cited by examiner

*Primary Examiner* — Scott J Walthour
(74) *Attorney, Agent, or Firm* — Snell & Wilmer L.L.P.

(57) ABSTRACT

A multi-engine system includes a first gas turbine engine that includes a first compressor and a first turbine. The multi-engine system may further include a second gas turbine engine that has a second compressor and a second turbine. Still further, the multi-engine system may include a first crossover cooling network configured to route a first crossover airflow from the first compressor of the first gas turbine engine to the second turbine of the second gas turbine engine and a second crossover cooling network configured to route a second crossover airflow from the second compressor of the second gas turbine engine to the first turbine of the first gas turbine engine.

19 Claims, 10 Drawing Sheets

CROSSOVER COOLING FLOW FOR MULTI-ENGINE SYSTEMS

FIELD

The present disclosure relates to multi-engine systems, and more specifically to inter-engine cooling flow.

BACKGROUND

Many systems utilize multiple engines to provide power. For example, a rotorcraft (e.g., a helicopter) may utilize two or more engines to drive the rotors and otherwise provide power to the rotorcraft. The multiple engines of these systems are often operated symmetrically. That is, these multi-engine systems are often controlled so that each engine of the multiple engines functions at substantially the same operating parameters. However, overall fuel consumption may be reduced by, for example, shutting down one of the engines while leaving one of the engines operating. Such asymmetric operation, however, has various control challenges.

SUMMARY

In various embodiments, the present disclosure provides a multi-engine system. The multi-engine system may include a first gas turbine engine that includes a first compressor and a first turbine. The multi-engine system may further include a second gas turbine engine that has a second compressor and a second turbine. Still further, the multi-engine system may include a first crossover cooling network configured to route a first crossover airflow from the first compressor of the first gas turbine engine to the second turbine of the second gas turbine engine and a second crossover cooling network configured to route a second crossover airflow from the second compressor of the second gas turbine engine to the first turbine of the first gas turbine engine.

In various embodiments, the first gas turbine engine has a first power turbine, the second gas turbine engine has a second power turbine, the multi-engine system is a rotorcraft with a main rotor gearbox, and the main rotor gearbox is mechanically coupled to both the first power turbine and the second power turbine. In various embodiments, the first crossover cooling network extends from the first compressor to a second vane row of the second turbine and the second crossover cooling network extends from the second compressor to a first vane row of the first turbine. For example, the second vane row may be a second forward-most vane row of the second turbine and the first vane row may be a first forward-most vane row of the first turbine.

In various embodiments, the second forward-most vane row of the second turbine may comprise a plurality of second vanes, wherein each second vane of the plurality of second vanes defines a second leading edge chamber and a second body chamber aft of the second leading edge chamber. The first crossover cooling network may be configured to route the first crossover airflow to the second body chamber. Further, the first forward-most vane row of the first turbine may comprise a plurality of first vanes, wherein each first vane of the plurality of first vanes defines a first leading edge chamber and a first body chamber aft of the first leading edge chamber. The second crossover cooling network may be configured to route the second crossover airflow to the first body chamber.

In various embodiments, the first gas turbine engine includes a first intra-engine cooling network configured to route a first resident airflow from forward of the first turbine to the first leading edge chamber of the plurality of first vanes of the first forward-most vane row of the first turbine. In various embodiments, the second gas turbine engine includes a second intra-engine cooling network configured to route a second resident airflow from forward of the second turbine to the second leading edge chamber of the plurality of second vanes of the second forward-most vane row of the second turbine.

In various embodiments, in response to the multi-engine system operating in an intermediate rated power mode, the first crossover airflow is between 5% and 20% of a first total compressor flow through the first compressor and the second crossover airflow is between 5% and 20% of a second total compressor flow through the second compressor. In various embodiments, in response to the multi-engine system operating in an intermediate rated power mode, the first crossover airflow is 10% of the first total compressor flow through the first compressor and the second crossover airflow is 10% of the second total compressor flow through the second compressor. In various embodiments, in response to the multi-engine system operating in an intermediate rated power mode, the first total compressor flow is 100% of a first compressor inlet corrected flow capacity of the first compressor and the second total compressor flow is 100% of a second compressor inlet corrected flow capacity of the second compressor.

In various embodiments, in response to the multi-engine system operating in an asymmetric cruise mode, the first crossover airflow is between 5% and 20% of a first total compressor flow through the first compressor and the second crossover airflow is 0% of a second total compressor flow through the second compressor. In various embodiments, in response to the multi-engine system operating in an asymmetric cruise mode, the first crossover airflow is 10% of the first total compressor flow through the first compressor and the second crossover airflow is 0% of the second total compressor flow through the second compressor. In various embodiments, in response to the multi-engine system operating in an asymmetric cruise mode, the first total compressor flow is 99% of a first compressor inlet corrected flow capacity of the first compressor and the second total compressor flow is 40% of a second compressor inlet corrected flow capacity of the second compressor. In various embodiments, in response to the multi-engine system operating in an asymmetric cruise mode, the second gas turbine engine is operating at a fuel rate that is lower than self-sustaining idle parameters of the second gas turbine engine when operating independent of the first crossover airflow from the first gas turbine engine. In various embodiments, an electric load, via a generator, is applied to the second gas turbine engine.

In various embodiments, in response to the multi-engine system operating in a one-engine-inoperable mode, the first crossover airflow is 10% of a first total compressor flow through the first compressor and the second crossover airflow is 0% of a second total compressor flow through the second compressor. In various embodiments, in response to the multi-engine system operating in a one-engine-inoperable mode, the first total compressor flow is 105% of a first compressor inlet corrected flow capacity of the first compressor and the second total compressor flow is 0% of a second compressor inlet corrected flow capacity of the second compressor.

In various embodiments, the first crossover cooling network includes at least one of a first check valve configured to prevent backflow of the first crossover airflow and a first controlled valve configured to control the first crossover airflow and the second crossover cooling network comprises at least one of a second check valve configured to prevent backflow of the second crossover airflow and a second controlled valve configured to control the second crossover airflow.

Also disclosed herein, according to various embodiments, is a method of operating a multi-engine system. The method may include, in response to the multi-engine system operating in an asymmetric cruise mode, routing a portion of a total compressor flow of a compressor of a first gas turbine engine through a crossover cooling network that extends from the compressor of the first gas turbine engine to a second gas turbine engine. The method may also include operating the second gas turbine engine at a fuel rate that is lower than a self-sustaining idle fuel rate of the second gas turbine engine if the second gas turbine engine were operating independent of the portion of the total compressor flow of the compressor of the first gas turbine engine. In various embodiments, during operation of the multi-engine system in the asymmetric cruise mode, overall power generation is the same as, but overall fuel consumption is lower than, if the multi-engine system were operating under a symmetric cruise mode.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
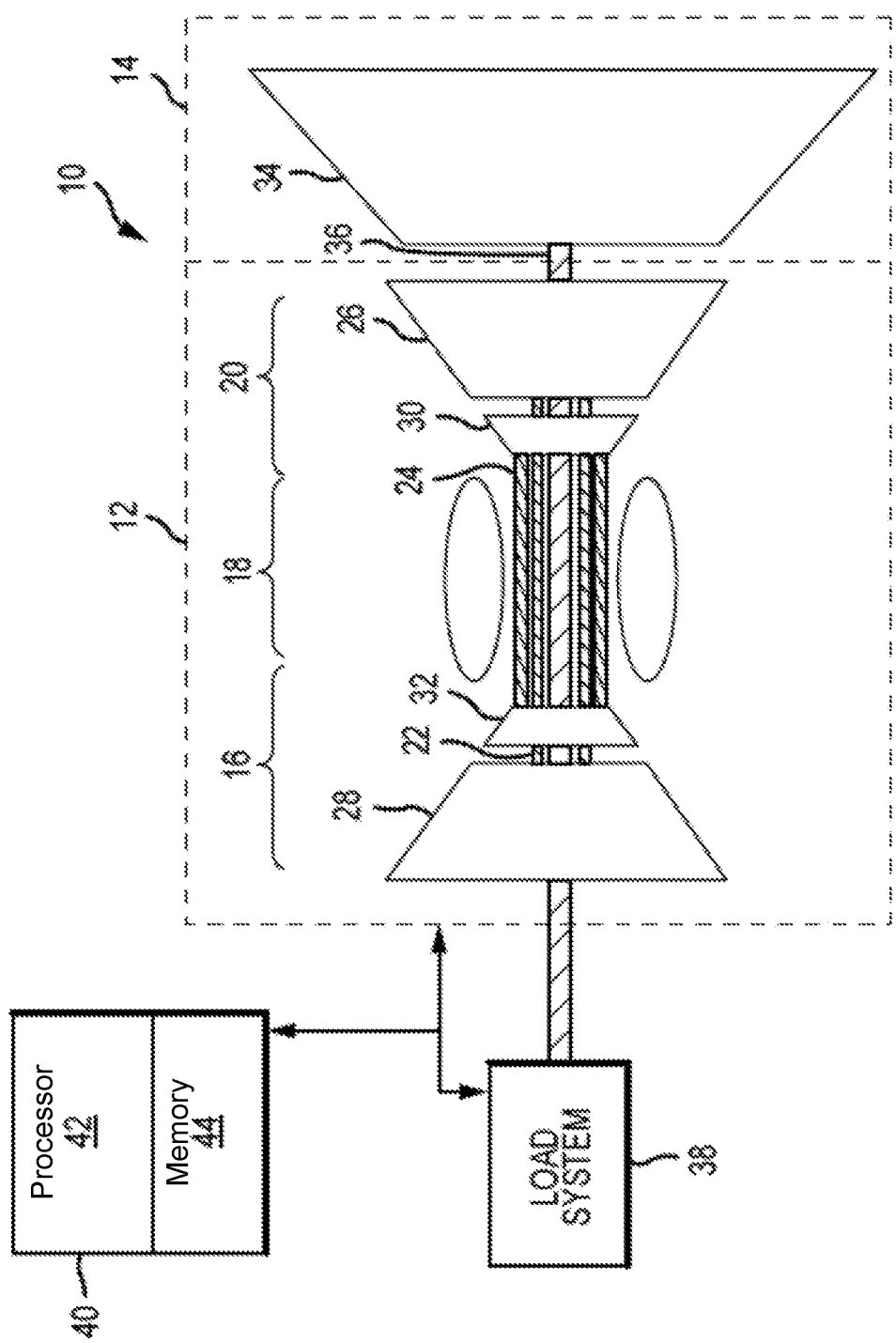
FIG. 1 is a schematic cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Disclosed herein, according to various embodiments, is a multi-engine system comprising inter-engine cooling flows. While numerous details and embodiments herein reference a rotorcraft (e.g., a helicopter), the scope of the disclosure is not necessarily limited to rotorcraft, and thus the multi-engine system may be implemented in power generation applications, vehicles, other aircraft, etc.

Referring now to FIG. 1 and according to various embodiments, an exemplary gas turbine engine 10 is shown. As described in greater detail below, the multi-engine system 100 (FIG. 2) may include multiple identical gas turbine engines, such as exemplary gas turbine engine 10, or the multi-engine system 100 may include engines that are not identical. In various embodiments, the gas turbine engine 10 is a turboshaft engine, such as can be used in an aircraft application, such as a helicopter. In various embodiments, the gas turbine engine 10 comprises a gas generator 12 and/or a power turbine 14 arranged in a series flow with an upstream inlet proximate the gas generator 12 and a downstream exhaust proximate the power turbine 14.

In various embodiments, the gas generator 12 includes a compressor section 16 where air is compressed/pressurized, a combustor section 18 downstream of the compressor section 16 where the compressed air is mixed with fuel and ignited to generate hot combustion gases, and a turbine section 20 downstream of the combustor section 18 for extracting power from the hot combustion gases, such as by causing the blades of a turbine to rotate.

In various embodiments, the gas generator 12 further comprises a multi-spool coaxially nested configuration, including a low pressure spool 22 and a high pressure spool 24. In various embodiments, the low pressure spool 22 and the high pressure spool 24 operate in different directions, as well as at different pressures, speeds, and/or temperatures. In various embodiments, a low pressure turbine 26 is mounted to the low pressure spool 22 to drive a low pressure compressor 28, and a high pressure turbine 30 is mounted to the high pressure spool 24 to drive a high pressure compressor 32. As used herein, "low pressure" components generally experience lower pressures than corresponding "high pressure" components when the gas turbine engine 10 operates.

In various embodiments, the power turbine 14 comprises a turbine 34 (e.g., a "power turbine") mounted to a turbine spool 36. In operation, the gas generator 12 generates combustion gases that impart torque to the turbine spool 36 through the turbine 34. In various embodiments, the turbine spool 36 drives a load system 38, such as an electrical generator, power turbine, propeller, rotor, pump system, etc.

In various embodiments, the multi-engine system 100 (FIG. 2) and/or each gas turbine engine 10 may have a controller 40 configured to control the multi-engine system 100 (FIG. 2) and/or each gas turbine engine 10. Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In re Nuijten to fall outside the scope of patentable subject matter under 35 U.S.C. § 101.

In various embodiments, the controller 40 comprises a Full-Authority Digital Engine Control (FADEC) system for use with an aircraft gas turbine engine 10. In various embodiments, the controller 40 includes one or more processors 42 and one or more tangible, non-transitory memories 44 configured to implement digital or programmatic logic. In various embodiments, for example, the one or more processors 42 comprise one or more of an application specific integrated circuit (ASIC), digital signal processor (DSP), field programmable gate array (FPGA), general purpose processor, and/or other programmable logic device, discrete gate, transistor logic, or discrete hardware components, or any various combinations thereof and/or the like, and the one or more tangible, non-transitory memories 44 store instructions that are implemented by the one or more processors 42 for performing various functions, such as the systems and methods of the inventive arrangements described herein.

Figure 2:
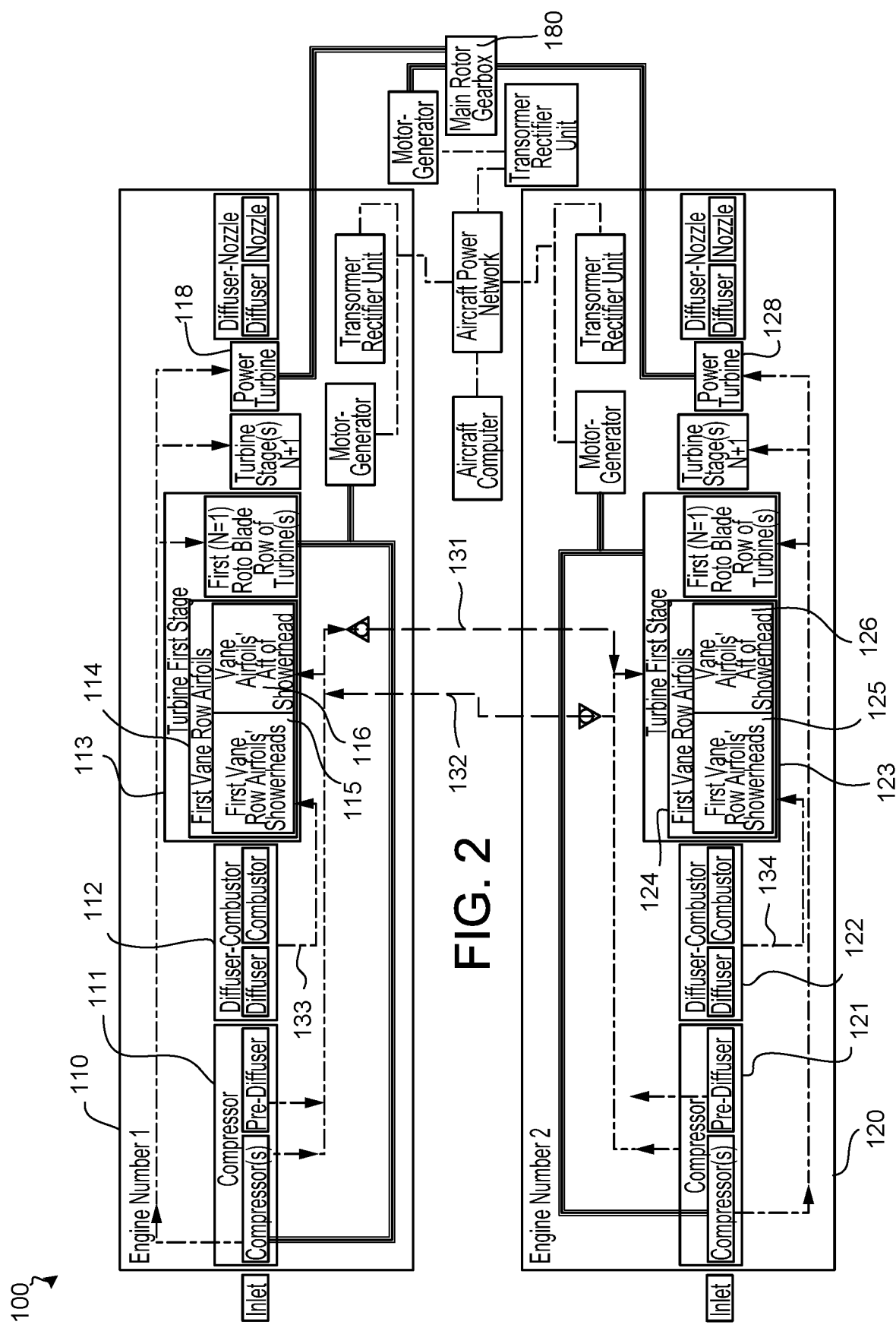
FIG. 2 is a schematic view of a multi-engine system having crossover cooling flow networks, in accordance with various embodiments.
Figure 3:
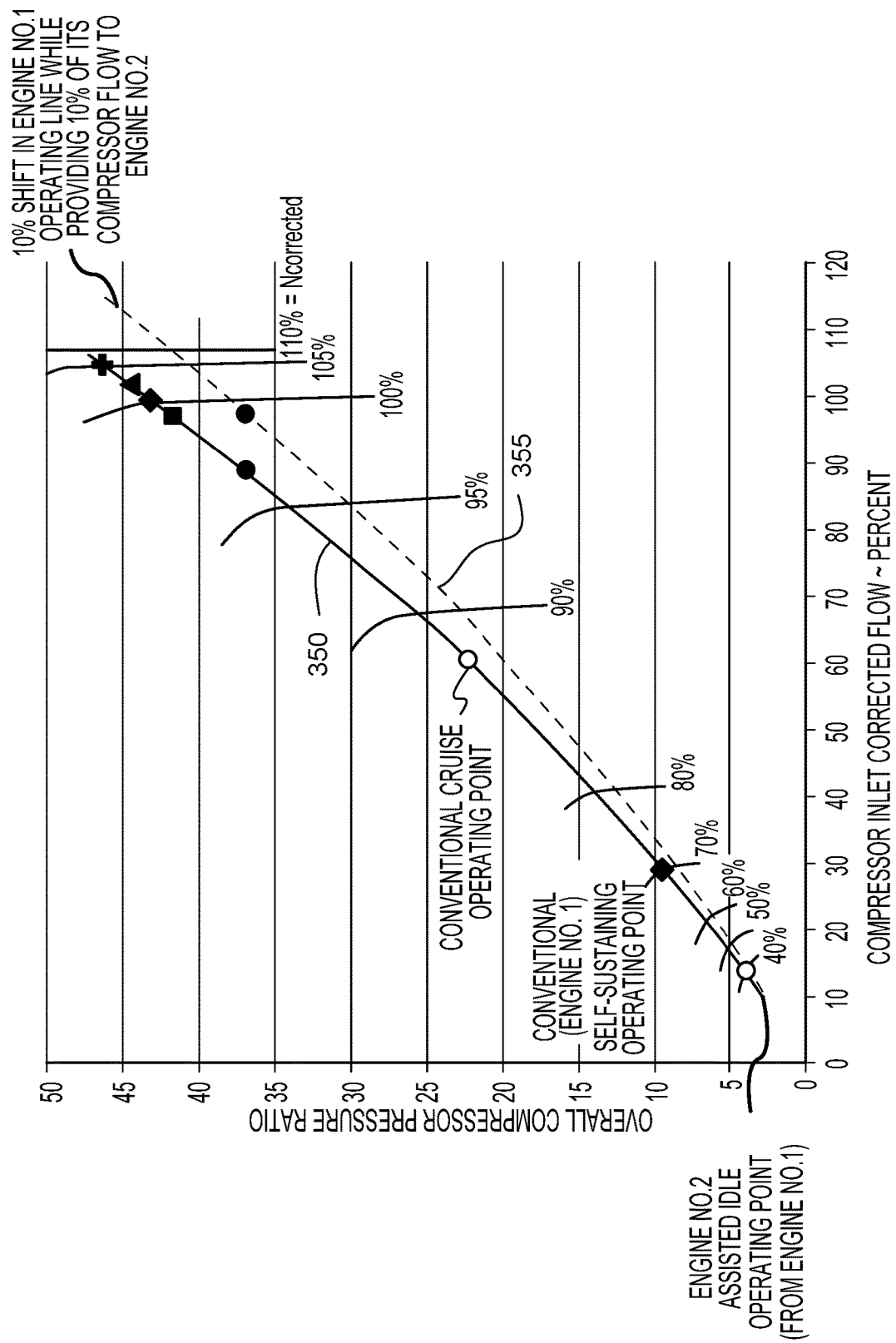
FIG. 3 is a graph showing operating lines of a multi-engine system, in accordance with various embodiments.

In various embodiments, and with reference to FIGS. 2 and 3, the multi-engine system 100 is provided. The multi-engine system 100 generally includes a first gas turbine engine 110 and a second gas turbine engine 120. Each gas turbine engine 110, 120, which may be the same as or similar to gas turbine engine 10 described above with reference to FIG. 1, has a compressor 111, a diffuser-combustor 112, a turbine 113, etc., according to various embodiments. That is, the first gas turbine engine 110 may have a first compressor 111, a first diffuser-combustor 112, and a first turbine 113 and the second gas turbine engine 120 may have a second compressor 121, a second diffuser-combustor 122, and a second turbine 123. The first and second gas turbine engines 110, 120 may each include a power turbine—first gas turbine engine 110 may include a first power turbine 118 and the second gas turbine engine may include a second power turbine 128—and these power turbines may both be mechanically coupled, for example, to a main rotor gearbox of a rotorcraft.

The multi-engine system 100 may further include a means for routing cooling flow between the gas turbine engines. For example, the multi-engine system 100 may include a first crossover cooling network 131 and a second crossover cooling network 132. Generally, these crossover cooling networks 131, 132 are configured to create inter-engine cooling flow between the first and second gas turbine engines 110, 120. That is, the first crossover cooling network 131 may be configured to route a first crossover airflow from the first compressor 111 of the first gas turbine engine 110 to the second turbine 123 of the second gas turbine engine 120 and the second crossover cooling network 132 may be configured to route a second crossover airflow from the second compressor 121 of the second gas turbine engine 120 to the first turbine 113 of the first gas turbine engine 110. As described in greater detail below with reference to the various operating modes of the multi-engine system 100, the dual crossover cooling networks 131, 132 enable the inter-engine transfer of flow energy (e.g., enthalpy) in order to enable asymmetric operation of the gas turbine engines 110, 120, which may result in overall improved fuel efficiency of the multi-engine system 100. While numerous details and embodiments are included herein pertaining to a configuration of two gas turbine engines 110, 120, the multi-engine system 100 may include more than two engines (e.g., three or more).

In various embodiments, the first and second crossover cooling networks 131, 132 each comprises a series of tubes, pipes, channels, chambers, plenums, etc., for directing cooling airflow from the compressor of one gas turbine engine to the turbine of the other gas turbine engine. The first and second crossover airflows that flow through the first and second crossover cooling networks 131, 132, respectively, may be a percentage of total compressor flow. That is, the first crossover airflow being routed via the first crossover cooling network 131 may comprise between about 5% and about 20% of a first total compressor flow through the first compressor 111 and the second crossover airflow being routed via the second crossover cooling network 132 may similarly comprises between about 5% and about 20% of a second total compressor flow through the second compressor 121. In various embodiments, the first crossover airflow is about 10% of the first total compressor flow through the first compressor 111 and the second crossover airflow is about 10% of the second total compressor flow through the second compressor 121. As used in this context, the term "about" refers to plus or minus 2%.

As used herein, the term "crossover airflow" refers to the cooling air from the compressors of one of the gas turbine engines that is configured to crossover (i.e., flow) from one engine to the other. Accordingly, the term "first crossover airflow" refers to the air being directed inter-engine (e.g., from the first gas turbine engine 110 to the second gas turbine engine 120) via the first crossover cooling network 131 and the term "second crossover airflow" refers to the air being directed inter-engine (e.g., from the second gas turbine engine 120 to the first gas turbine engine 110) via the second crossover cooling network 132. Thus, while each of the first and second crossover cooling networks 131, 132 shown in FIG. 2 has a split that allows the cooling air to flow to the other engine or to flow directly to its own engine's turbine, the term "crossover airflow" refers only to the portion that that actually transfers between engines and does not refer to the flow of air that returns back to the same engine from which it was diverted. Accordingly, each crossover cooling network 131, 132 may initially (e.g., at or near the inlet of the crossover cooling network where cooling air is diverted from the compressor) have between about 10% and about 40% of the total compressor flow being directed there-through, which may be divided downstream so that between about 5% and about 20% (relative to the total compressor flow) flows to the other gas turbine engine (the "crossover airflow), with the other portion (5%-20%) flowing to the turbine of the same engine from which it was diverted. In various embodiments, each crossover cooling network 131, 132 may initially (e.g., at or near the inlet of the crossover cooling network where cooling air is diverted from the compressor) have between about 15% and about 30% of the total compressor flow being directed there-through. In various embodiments, each crossover cooling network 131, 132 may initially (e.g., at or near the inlet of the crossover cooling network where cooling air is diverted from the compressor) have about 10% of the total compressor flow being directed there-through. As used in this context only, the term "about" refers to plus or minus 2%. Accordingly, in various embodiments, vanes of the turbine of one of the gas turbine engines may be configured to be supplied with cooling airflow from its own compressor and from the other gas turbine engine. Additional details pertaining to the relative flows of cooling airflow are included below with reference to exemplary operating modes of the multi-engine system 100.

In various embodiments, the first crossover cooling network 131 extends from the first compressor 111 of the first gas turbine engine 110 to a second vane row 124 (no ordinal or positional meaning is intended for the term "second" in this context) of the second turbine 123 of the second gas turbine engine 120. Similarly, the second crossover cooling network 132 may extend from the second compressor 121 of the second gas turbine engine 120 to a first vane row 114 of the first turbine 113 of the first gas turbine engine 110. In various embodiments, the second vane row 124 is a second forward-most vane row of the second turbine 123 and the first vane row 114 is a first forward-most vane row of the first turbine 113. Said differently, the vanes to which the crossover airflows are directed may be the vanes immediately downstream (e.g., aft) of the diffuser-combustor 112, 122 which are subjected to comparatively higher temperatures, according to various embodiments.

In various embodiments, the first forward-most vane row (e.g., 114) of the first turbine 113 comprises a plurality of first vanes, wherein each first vane of the plurality of first vanes defines a first leading edge chamber 115 and a first body chamber 116 that is aft of the first leading edge chamber 115. The second crossover cooling network 132 may be configured to route the second crossover airflow to the first body chamber 116 and may not direct the second crossover airflow to the first leading edge chamber 115. In such a configuration, the leading first edge chamber 115 may be supplied with a first resident airflow via a first intra-engine cooling network 133. That is, the first leading edge chamber 115, which may have an array of cooling holes (e.g., also referred to as a "showerhead"-type array of cooling holes) along or adjacent the leading edge of the airfoil shape of the first vanes, may be fluidly isolated from the second crossover flow and may instead be supplied by its own engine's cooling flow, referred to herein as first resident airflow, via the first intra-engine cooling network 133. Correspondingly, the second forward-most vane row (e.g., 124) of the second turbine 123 comprises a plurality of second vanes, wherein each second vane of the plurality of second vanes defines a second leading edge chamber 125 and a second body chamber 126 that is aft of the second leading edge chamber 125. The first crossover cooling network 131 may be configured to route the first crossover airflow to the second body chamber 126 and may not direct the first crossover airflow to the second leading edge chamber 125. In such a configuration, the second leading edge chamber 125 may be supplied with a second resident airflow via a second intra-engine cooling network 134. That is, the second leading edge chamber 125, which may have "showerhead-type" cooling holes along or adjacent the leading edge of the airfoil shape of the second vanes, may be fluidly isolated from the first crossover flow and may instead be supplied by its own engine's cooling flow, referred to herein as second resident airflow, via the second intra-engine cooling network 134. Each of the gas turbine engines 110, 120 may also have other intra-engine cooling networks, and/or the described cooling networks may be routed through various portions of the respective engines.

In various embodiments, and with reference to FIG. 3, a conventional operating line 350 of a gas turbine engine is provided, as well as a modified operating line 355 of a gas turbine engine that has been configured to provide crossover flow to another gas turbine engine. In various embodiments, the gas turbine engines 110, 120 of the multi-engine system 100 have been designed and/or configured to have extra cooling flow capacity (as indicated by the modified operating line 355). The conventional operating line 350 shows a conventional cruise operating point as well as a conventional self-sustaining idle point that represents the lowest operating conditions of a gas turbine engine while still maintaining a self-sufficient idle.

Figure 4A:
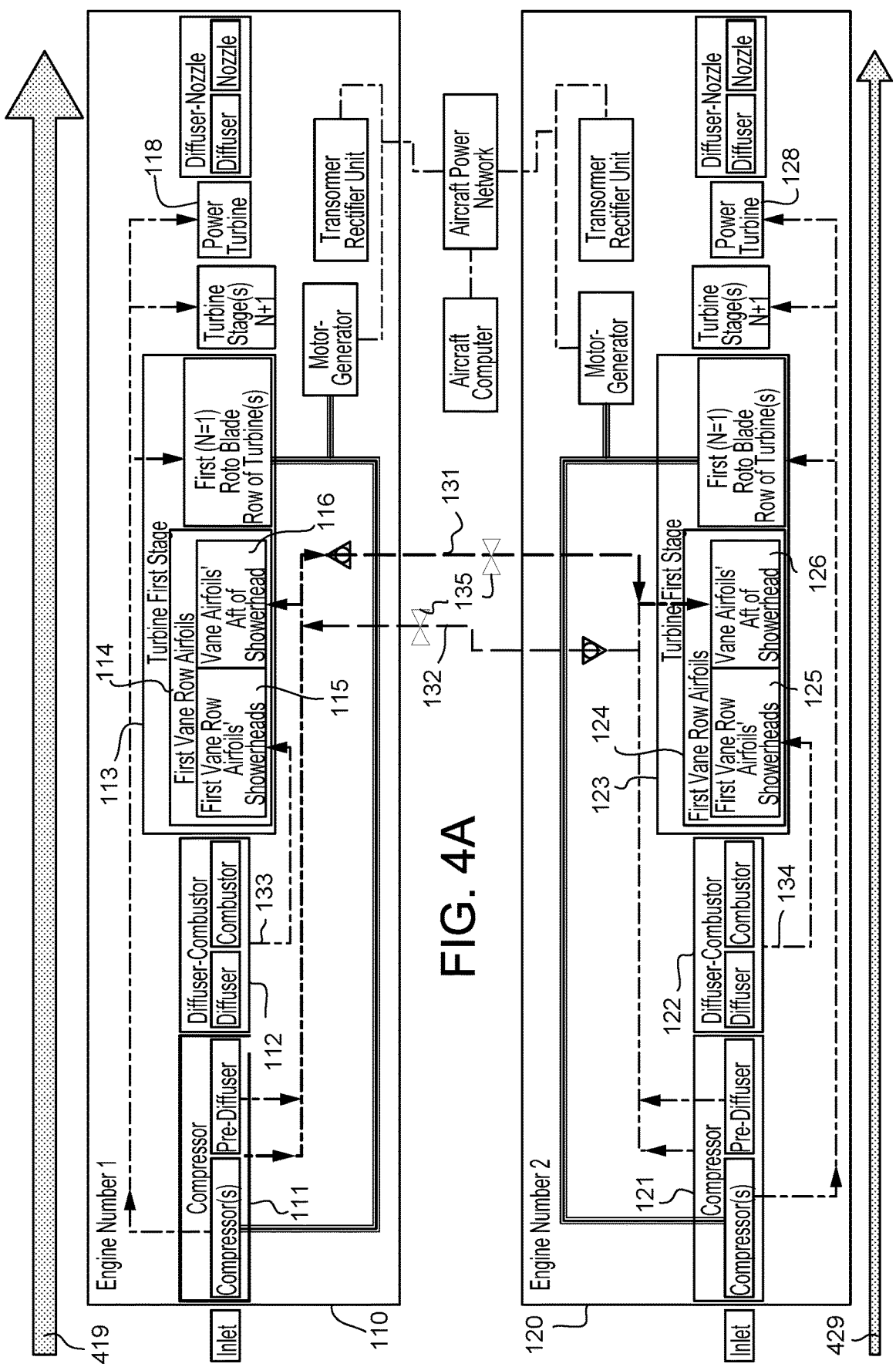
FIG. 4A is a schematic view of a multi-engine system operating in an asymmetric cruise mode, in accordance with various embodiments.
Figure 4B:
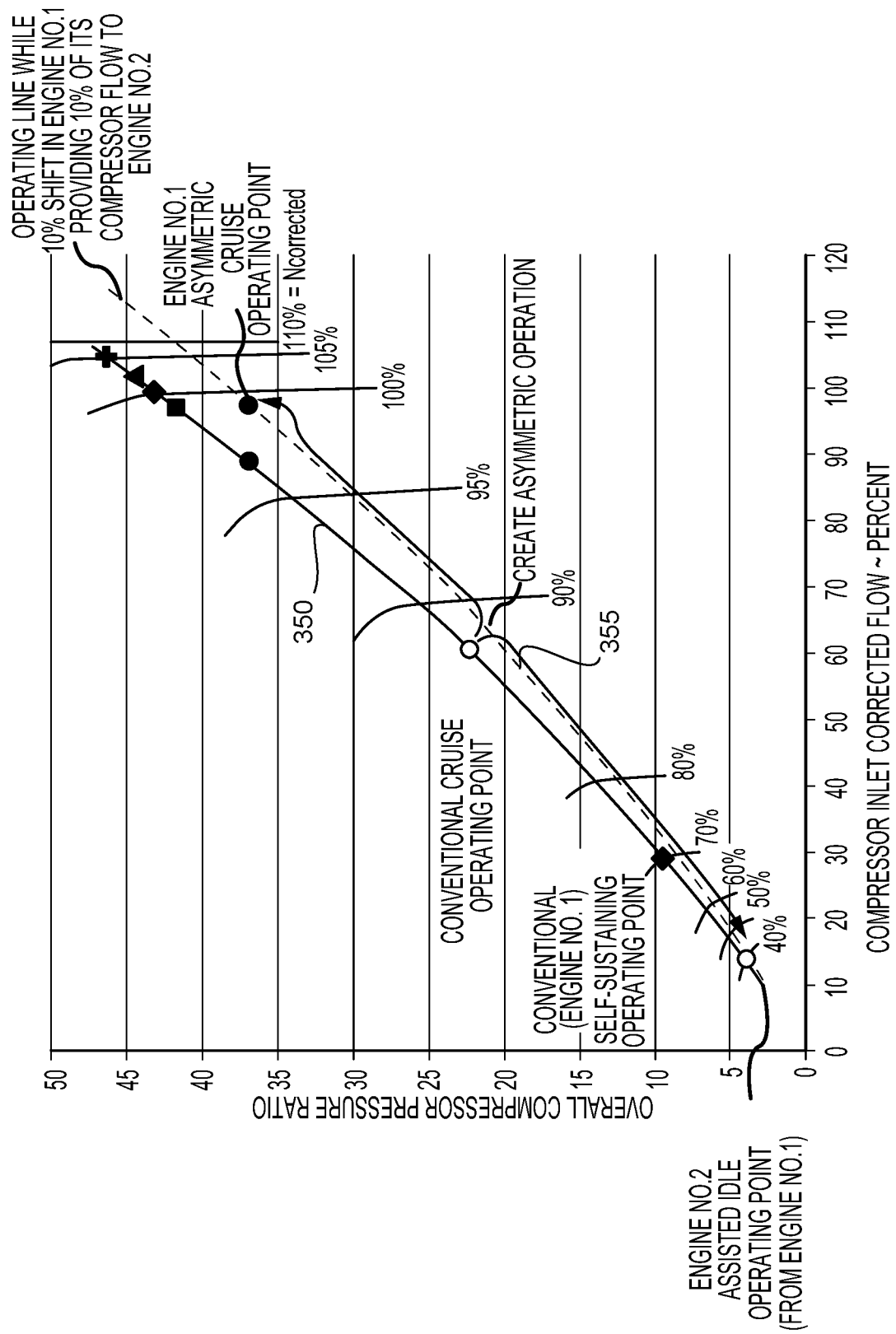
FIG. 4B is a graph showing operation of a multi-engine system in an asymmetric cruise mode, in accordance with various embodiments.

In various embodiments, and with reference to FIGS. 4A and 4B, an asymmetric operating mode of the multi-engine system 100 is provided. The asymmetric operating mode of FIGS. 4A and 4B may also be referred to as an asymmetric cruise mode. In the asymmetric cruise mode, the first gas turbine engine 110 may be generally configured to increase its operation and the second gas turbine engine 120 may be generally configured to decrease its operation. Said differently, the first gas turbine engine 110 may be configured to operate at a higher power rating while the second gas turbine engine 120 may be configured to operate at a lower power rating. In various embodiments, this lower power rating of the second gas turbine engine 120 is lower than the aforementioned self-sustaining idle point of a conventional gas turbine engine (e.g., lower than the self-sustaining idle point of the second gas turbine engine with no crossover flow).

That is, as schematically depicted and represented by arrows 419 and 429 in FIG. 4A, and as it corresponds to the x-axis of the graph of FIG. 4B, the first gas turbine engine 110 may be configured to operate with a first total compressor flow that is operating at or near full capacity. That is, the first gas turbine engine 110 may operate with a first total compressor flow that is between about 90% and 100% (e.g., 99%) of a first compressor inlet corrected flow capacity of the first compressor 111 while the second gas turbine engine 120 may be configured to operate with a second total compressor flow that is less than or equal to 40% of a second compressor inlet corrected flow capacity of the second compressor 121.

As seen in the graph in FIG. 4B, the operating point of the second gas turbine engine 120 in the asymmetric cruise mode may be below what would otherwise be the minimal operating power of the second gas turbine engine 120 to maintain self-sustaining idle. This lower operating point is possible because of the first crossover airflow from the first gas turbine engine 110 to the second turbine 123 of the second gas turbine engine 120. This first crossover airflow provides flow energy (e.g., enthalpy) to the second gas turbine engine 120, thereby enabling the fuel rate of the second gas turbine engine 120 to be lower than would otherwise be possible because the first crossover airflow augments and supplements the operation of the second gas turbine engine 120. In various embodiments, the first gas turbine engine 110 operates more efficiently at the elevated/ higher operating point, and thus the overall fuel consumption rate of the multi-engine system 100 operating in the asymmetric cruise mode described herein may be lower than if both gas turbine engines 110, 120 were operating under a symmetric/conventional cruise mode. In various embodiments, the second gas turbine engine 120, even at this lower operating point, may have an electric load applied thereto, such as via a generator mechanically coupled to one or more of the turbine sections of the gas turbine engine 120.

In various embodiments, the first crossover airflow flowing through the first crossover cooling network 131 is between about 5% and about 20%, as mentioned above, of the first total compressor flow through the first compressor 111 while there is no flow through the second crossover cooling network 132 (e.g., the second crossover airflow is 0). The one-directional crossover flow from the first gas turbine engine 110 to the second gas turbine engine 120 may be passively achieved due to the difference of the pressures between the cooling airflow from the respective compressors 111, 121 of the gas turbine engines 110, 120. In various embodiments, the crossover cooling networks 131, 132 may include one or more valves, such as a check valve to prevent backflow of the crossover airflows and/or a controlled valve to control the flow of the crossover airflows. Accordingly, the one directional crossover flow (from the engine at the higher operating power to the engine at the lower operating power) may be actively controlled via a controlled valve (e.g., one or both of the valves 135 shown in FIG. 4A).

Below is a table that shows one example of the contrasting operating variables of a multi-engine system operating in a conventional cruise mode versus the asymmetric cruise mode described herein and enabled by the crossover airflow:

| Cruise For One hour | Conventional | | Axisymmetric Hybrid | |
|---|---|---|---|---|
| 100% Power = 7000 shp | Engine No. 1 | Engine No. 2 | Engine No. 1 | Engine No. 2 |
| Turbine Temperature | 3100 | 3100 | 3260 | 2050 |
| Thermodynamic Efficiency | 39.3% | 39.3% | 40.5% | 33.2% |
| SFC | 0.353 | 0.353 | 0.335 | 0.410 |
| % Flow | 60 | 60 | 94 | 18 |
| % Cross Bleed Flow | 0 | 0 | — | 9.4 |
| % Power | 50 | 50 | 90 | 10 |
| Fuel per engine, lbm | 1320 | 1320 | 2180 | 335 |
| Summation of Engine Fuel Used | 2640 lbm | | 2515 lbm | |

Figure 5A:
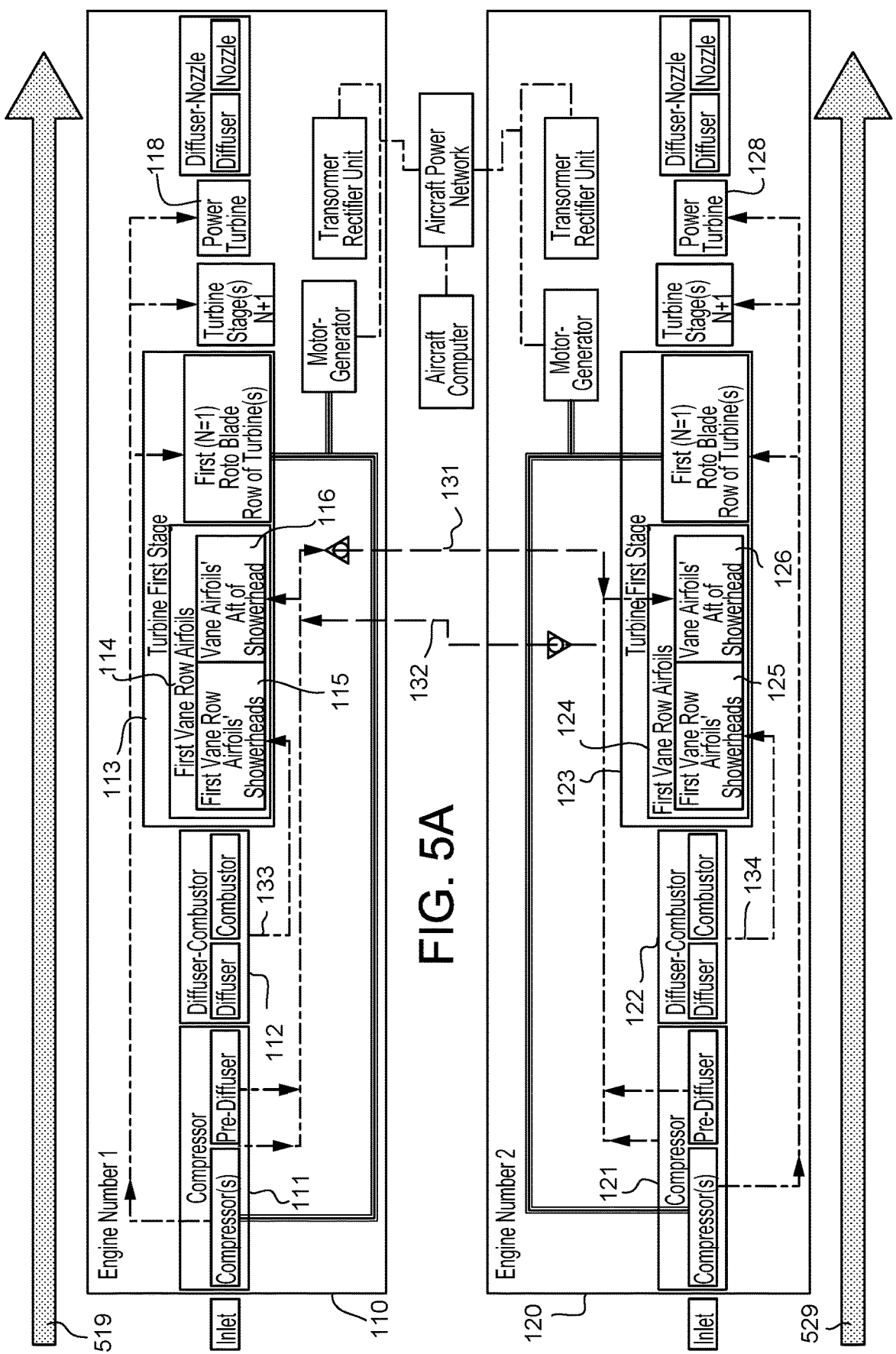
FIG. 5A is a schematic view of a multi-engine system operating in an intermediate rated power mode, in accordance with various embodiments.
Figure 5B:
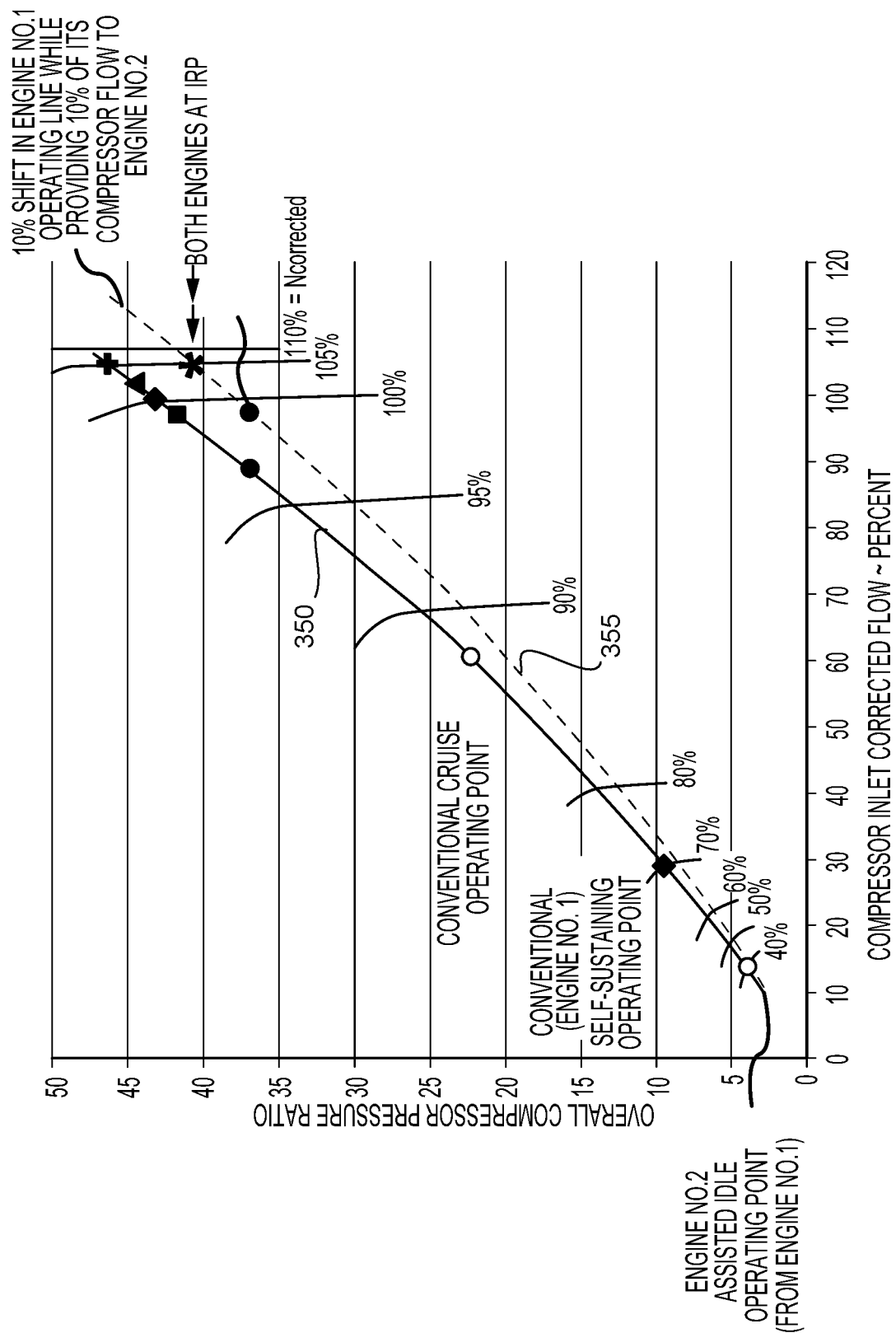
FIG. 5B is a graph showing operation of a multi-engine system in an intermediate rated power mode, in accordance with various embodiments.

In various embodiments, and with reference to FIGS. 5A and 5B, an intermediate rated power mode of the multi-engine system 100 is provided. In the intermediate rated power mode, both gas turbine engines 110, 120 may be generally configured to operate on the modified operating line 355 and may both operate at an increased power rating. That is, as schematically depicted and represented by arrows 519 and 529 in FIG. 5A, and as it corresponds to the x-axis of the graph of FIG. 5B, both the first gas turbine engine 110 and the second gas turbine engine 120 may be configured to operate with a total compressor flow that is substantially at 100% of a compressor inlet corrected flow capacity of the respective compressors. In such a configuration, both the first crossover cooling network 131 and the second crossover cooling network 132 are transferring inter-engine cooling flow, and thus the first crossover airflow flowing through the first crossover cooling network 131 may be between about 5% and about 20%, as mentioned above, of the first total compressor flow through the first compressor 111 while the second crossover cooling network 132 may similarly be between about 5% and about 20% of the second total compressor flow through the second compressor 121. Thus, the multi-engine system 100 may operate with bi-directional crossover flow, which may improve the operating efficiencies of the multi-engine system 100.

Figure 6A:
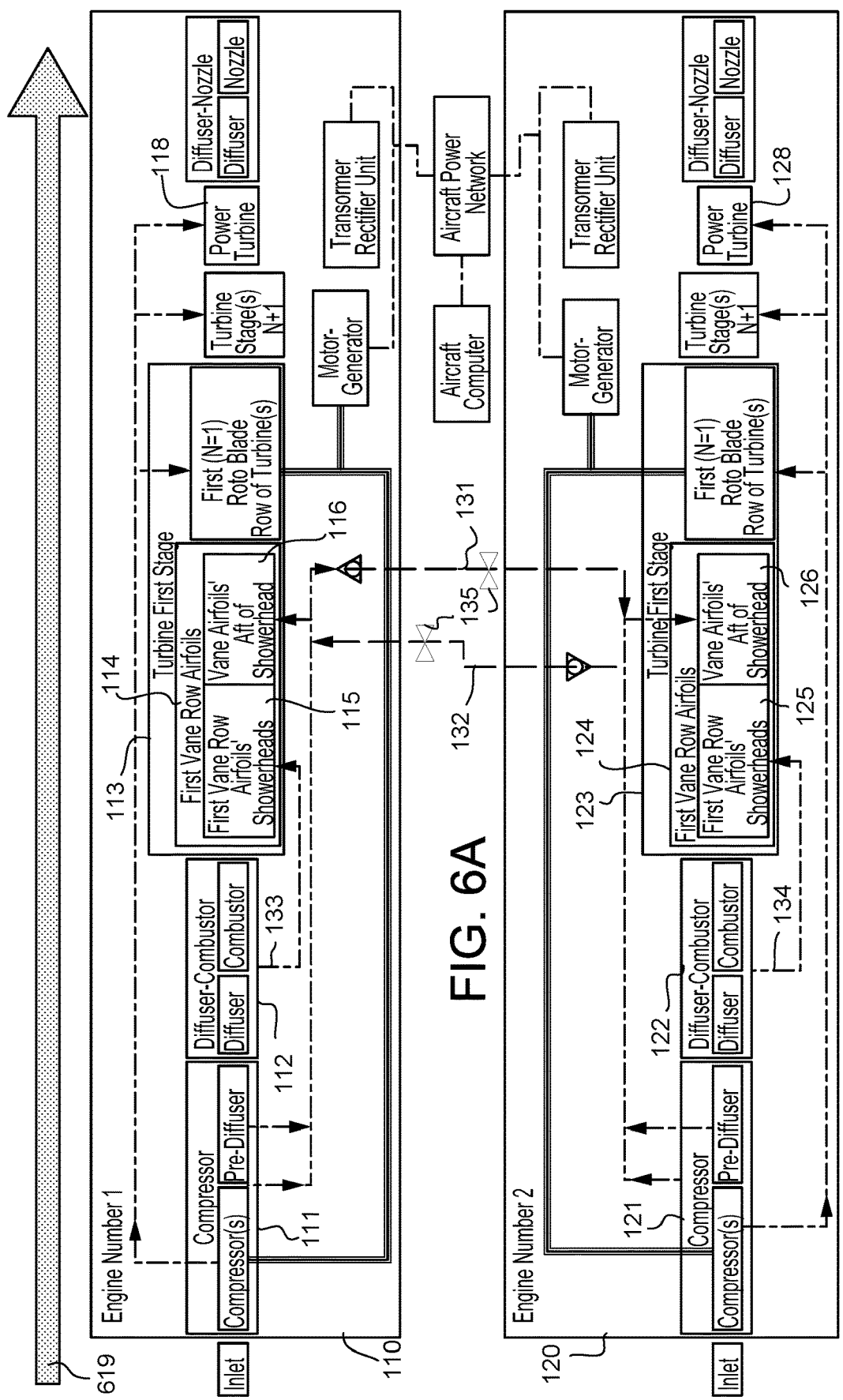
FIG. 6A is a schematic view of a multi-engine system operating in a one-engine-inoperable mode, in accordance with various embodiments.
Figure 6B:
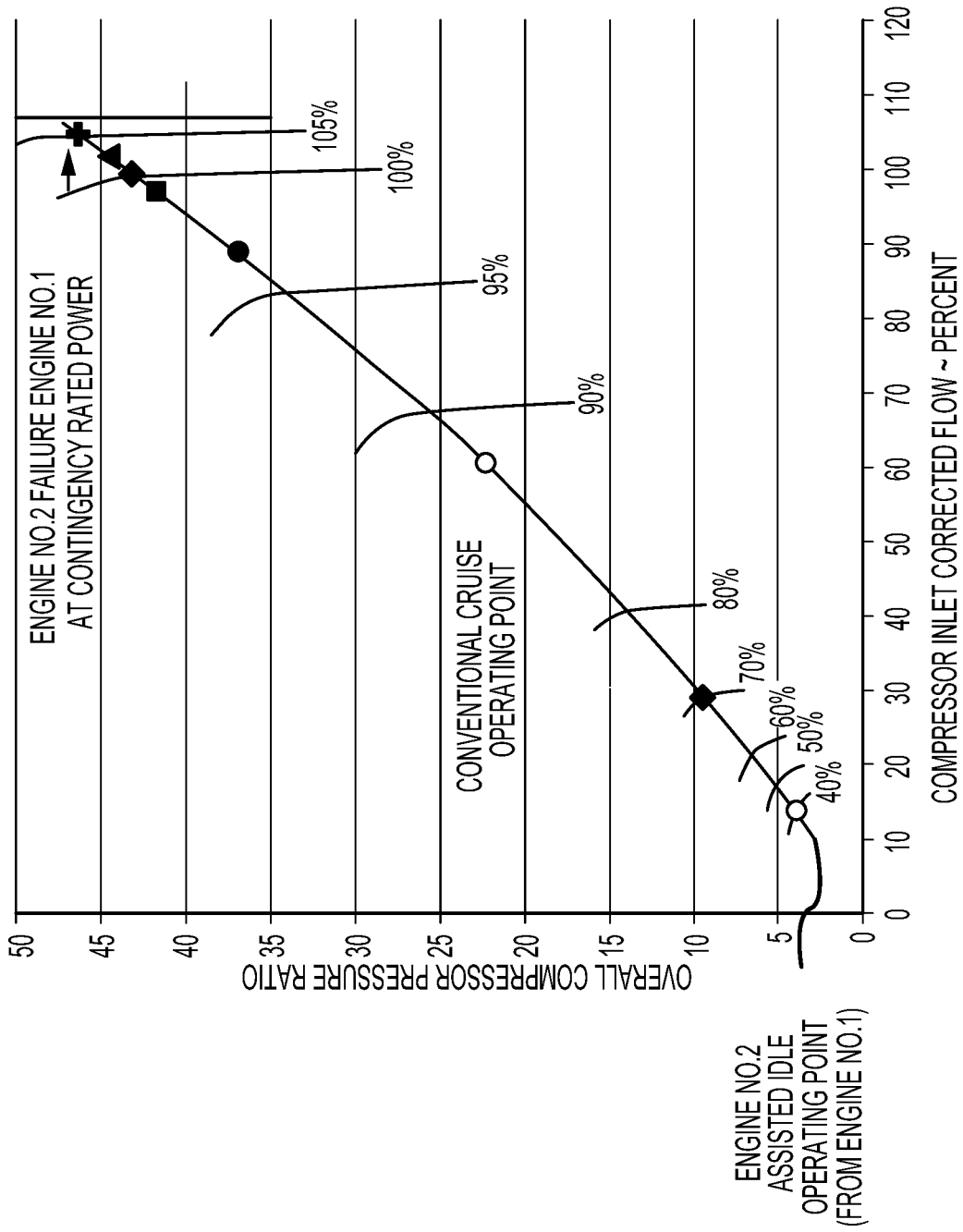
FIG. 6B is a graph showing operation of a multi-engine system in a one-engine-inoperable mode, in accordance with various embodiments.

In various embodiments, and with reference to FIGS. 6A and 6B, a one-engine-inoperable mode of the multi-engine system 100 is provided. In the one-engine-inoperable mode, for example, the first gas turbine engine 110 is operating at a contingency rated power while the second gas turbine engine 120 is inoperable. That is, as schematically depicted and represented by arrow 619 in FIG. 6A, and as it corresponds to the x-axis of the graph of FIG. 6B, the first gas turbine engine 110 may be configured to operate with a total compressor flow that is substantially above 100% (e.g., 105%) of the compressor inlet corrected flow capacity of the first compressor 111. Said differently, the first gas turbine engine 110, as mentioned above, may have been designed to have extra cooling flow and may thus be well-suited to operate at comparatively higher contingency power ratings because the excess cooling flow that would be routed inter-engine via the crossover networks during normal operating conditions may be used by the first gas turbine engine 110 at this overpowered, contingency power during a one-engine-inoperable mode, according to various embodiments.

In various embodiments, crossover flow may cease during operating in the one-engine-inoperable mode. However, in various embodiments, the first crossover airflow may continue to flow through the first crossover cooling network 131, thereby improving the possibility for future restoration of operation of the second gas turbine engine 120. Accordingly, in various embodiments, the first crossover airflow is 10% of a first total compressor flow through the first compressor 111 while the second crossover airflow may be 0.

Other operating modes may be utilized with the crossover cooling configuration disclosed herein. Accordingly, the exemplary operating modes described herein is not intended as an exhaustive list of the operating modes of the multi-engine system 100.

Figure 7:
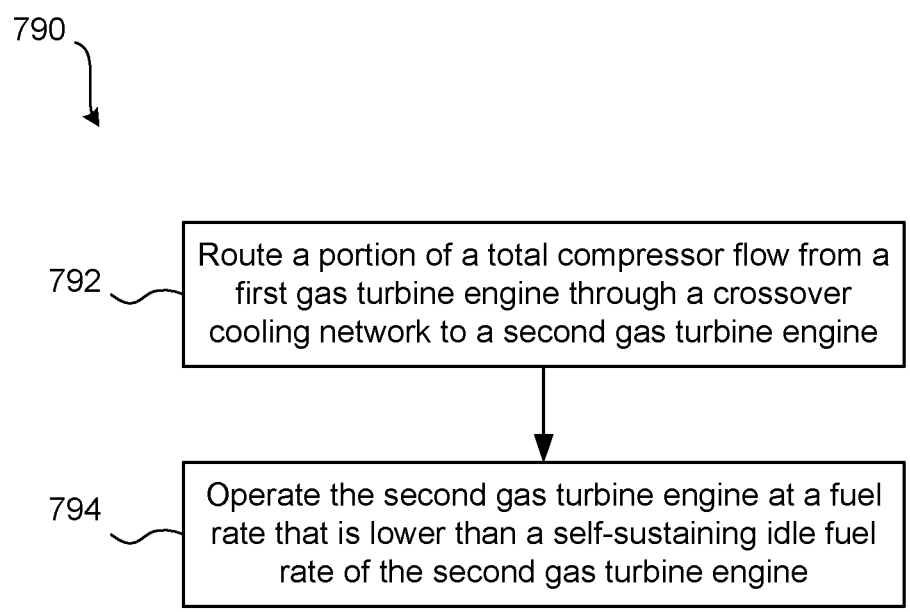
FIG. 7 is a schematic flow chart diagram of a method of operating a multi-engine system, in accordance with various embodiments.

In various embodiments, and with reference to FIG. 7, method 790 of operating a multi-engine system, such as system 100, is provided. The method 790 may include, in response to the multi-engine system operating in an asymmetric cruise mode, routing a portion of a total compressor flow from a first gas turbine engine through a crossover cooling network to a second gas turbine engine at step 792. The method 790 may further include operating the second gas turbine engine at a fuel rate that is lower than a self-sustaining idle fuel rate of the second gas turbine engine at step 794. Accordingly, the operation of the second gas turbine engine at step 794 comprises operating said engine at a fuel consumption rate that is lower than would otherwise be possible if it were not for the supplemented, crossover airflow from the first gas turbine engine. In various embodiments, during operation of the multi-engine system in the asymmetric cruise mode, the overall power generation may be the same as, but the overall fuel consumption may be lower than, if the two gas turbine engines were operating under a symmetric cruise mode (e.g., a conventional cruise mode).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-engine system comprising:
   a first gas turbine engine comprising a first compressor, a first turbine, and a first power turbine, the first compressor and the first turbine of the first gas turbine engine each configured to rotate about a first engine central longitudinal axis of the first gas turbine engine;
   a second gas turbine engine comprising a second compressor, a second turbine, and a second power turbine, the second compressor and the second turbine of the second gas turbine engine each configured to rotate about a second engine central longitudinal axis of the second gas turbine engine;
   a main rotor gearbox mechanically coupled to both the first power turbine and the second power turbine; and
   a first crossover cooling network for routing a first crossover airflow from the first compressor of the first gas turbine engine to the second turbine of the second gas turbine engine,
   wherein the first gas turbine engine and the second gas turbine engine are identical engines.

2. A multi-engine system comprising:
a first gas turbine engine comprising a first compressor and a first turbine, the first compressor and the first turbine of the first gas turbine engine each configured to rotate about a first engine central longitudinal axis of the first gas turbine engine;
a second gas turbine engine comprising a second compressor and a second turbine, the second compressor and the second turbine of the second gas turbine engine each configured to rotate about a second engine central longitudinal axis of the second gas turbine engine;
a first crossover cooling network configured to route a first crossover airflow from the first compressor of the first gas turbine engine to the second turbine of the second gas turbine engine; and
a second crossover cooling network configured to route a second crossover airflow from the second compressor of the second gas turbine engine to the first turbine of the first gas turbine engine.

3. The multi-engine system of claim 2, wherein the multi-engine system is configured to operate in a bi-directional crossover mode with both the first crossover cooling network and the second crossover cooling network having respective crossover flows flowing therethrough.

4. The multi-engine system of claim 2, wherein:
the first crossover cooling network extends from the first compressor to a second vane row of the second turbine; and
the second crossover cooling network extends from the second compressor to a first vane row of the first turbine.

5. The multi-engine system of claim 4, wherein:
the second vane row is a forward-most vane row of the second turbine; and
the first vane row is a forward-most vane row of the first turbine.

6. The multi-engine system of claim 5, wherein:
the forward-most vane row of the second turbine comprises a plurality of second vanes, wherein each second vane of the plurality of second vanes defines a second leading edge chamber and a second body chamber aft of the second leading edge chamber, wherein the first crossover cooling network is configured to route the first crossover airflow to the second body chamber; and
the forward-most vane row of the first turbine comprises a plurality of first vanes, wherein each first vane of the plurality of first vanes defines a first leading edge chamber and a first body chamber aft of the first leading edge chamber, wherein the second crossover cooling network is configured to route the second crossover airflow to the first body chamber.

7. The multi-engine system of claim 6, wherein:
the first gas turbine engine comprises a first intra-engine cooling network configured to route a first resident airflow from forward of the first turbine to the first leading edge chamber of the plurality of first vanes of the forward-most vane row of the first turbine; and
the second gas turbine engine comprises a second intra-engine cooling network configured to route a second resident airflow from forward of the second turbine to the second leading edge chamber of the plurality of second vanes of the forward-most vane row of the second turbine.

8. The multi-engine system of claim 2, wherein in response to the multi-engine system operating in an intermediate rated power mode:
the first crossover airflow is between 5% and 20% of a first total compressor flow through the first compressor; and
the second crossover airflow is between 5% and 20% of a second total compressor flow through the second compressor.

9. The multi-engine system of claim 8, wherein:
the first crossover airflow is 10% of the first total compressor flow through the first compressor; and
the second crossover airflow is 10% of the second total compressor flow through the second compressor.

10. The multi-engine system of claim 8, wherein:
the first total compressor flow is 100% of a first compressor inlet corrected flow capacity of the first compressor;
the second total compressor flow is 100% of a second compressor inlet corrected flow capacity of the second compressor.

11. The multi-engine system of claim 2, wherein in response to the multi-engine system operating in an asymmetric cruise mode:
the first crossover airflow is between 5% and 20% of a first total compressor flow through the first compressor; and
the second crossover airflow is 0% of a second total compressor flow through the second compressor.

12. The multi-engine system of claim 11, wherein:
the first crossover airflow is 10% of the first total compressor flow through the first compressor; and
the second crossover airflow is 0% of the second total compressor flow through the second compressor.

13. The multi-engine system of claim 11, wherein:
the first total compressor flow is between 90% and 100% of a first compressor inlet corrected flow capacity of the first compressor; and
the second total compressor flow is less than or equal to 40% of a second compressor inlet corrected flow capacity of the second compressor.

14. The multi-engine system of claim 2, wherein the first gas turbine engine and the second gas turbine engine are identical engines.

15. The multi-engine system of claim 14, wherein an electric load, via a generator, is applied to the second gas turbine engine.

16. The multi-engine system of claim 2, wherein in response to the multi-engine system operating in a one-engine-inoperable mode:
the first crossover airflow is 10% of a first total compressor flow through the first compressor; and
the second crossover airflow is 0% of a second total compressor flow through the second compressor.

17. The multi-engine system of claim 16, wherein:
the first total compressor flow is 105% of a first compressor inlet corrected flow capacity of the first compressor; and
the second total compressor flow is 0% of a second compressor inlet corrected flow capacity of the second compressor.

18. The multi-engine system of claim 2, wherein:
the first crossover cooling network comprises at least one of a first check valve configured to prevent backflow of the first crossover airflow and a first controlled valve configured to control the first crossover airflow; and
the second crossover cooling network comprises at least one of a second check valve configured to prevent backflow of the second crossover airflow and a second controlled valve configured to control the second crossover airflow.

19. A multi-engine rotorcraft comprising:
a first gas turbine engine comprising a first compressor, a first turbine, and a first power turbine;
a second gas turbine engine comprising a second compressor, a second turbine, and a second power turbine;
a main rotor gearbox mechanically coupled to both the first power turbine and the second power turbine;
a first crossover cooling network configured to route a first crossover airflow from the first compressor of the first gas turbine engine to a second vane row of the second turbine of the second gas turbine engine; and
a second crossover cooling network configured to route a second crossover airflow from the second compressor of the second gas turbine engine to a first vane row of the first turbine of the first gas turbine engine.

\* \* \* \* \*